(12) United States Patent
Nagatani

(10) Patent No.: US 6,556,312 B1
(45) Date of Patent: Apr. 29, 2003

(54) DATA CONVERTER AND METHOD

(75) Inventor: Masahiro Nagatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,908

(22) Filed: Jun. 30, 1999

(30) Foreign Application Priority Data

Jul. 2, 1998 (JP) .......................................... 10-187742

(51) Int. Cl.$^7$ .............................................. G06K 15/00
(52) U.S. Cl. ..................... 358/1.9; 358/500; 358/504; 358/518; 382/166; 382/167; 345/600; 345/601; 345/604
(58) Field of Search ......................... 358/1.9, 500, 504, 358/518, 523, 525; 345/600–601, 604–606; 382/166, 167

(56) References Cited

U.S. PATENT DOCUMENTS

| | | | | |
|---|---|---|---|---|
| 5,077,604 A | * | 12/1991 | Kivolowitz et al. | |
| 5,264,927 A | * | 11/1993 | Miyoshi et al. | |
| 5,349,452 A | * | 9/1994 | Maeda et al. | |
| 5,481,655 A | * | 1/1996 | Jacobs | |
| 5,592,591 A | * | 1/1997 | Rolleston | 358/1.5 |
| 5,664,072 A | * | 9/1997 | Ueda et al. | |
| 5,717,783 A | * | 2/1998 | Endo et al. | 358/518 |
| 5,729,664 A | * | 3/1998 | Ishikawa | |
| 5,748,176 A | * | 5/1998 | Gondek | 345/600 |
| 5,774,238 A | * | 6/1998 | Tsukada | |
| 5,801,855 A | * | 9/1998 | Ohta | |
| 5,828,780 A | * | 10/1998 | Suzuki et al. | |
| 5,875,260 A | * | 2/1999 | Ohta | |
| 5,930,388 A | * | 7/1999 | Murakami et al. | 358/518 |
| 5,987,167 A | * | 11/1999 | Inoue | 358/518 |
| 6,081,353 A | * | 6/2000 | Tanaka et al. | |
| 6,118,455 A | * | 9/2000 | Hidaka et al. | |
| 6,151,135 A | * | 11/2000 | Tanaka et al. | |
| 6,157,734 A | * | 12/2000 | Lida | |
| 6,160,635 A | * | 12/2000 | Usami | |
| 6,229,915 B1 | * | 5/2001 | Ohkubo | |
| 6,275,607 B1 | * | 8/2001 | Shimizu et al. | 358/523 |
| 6,323,969 B1 | * | 11/2001 | Shimizy et al. | |
| 6,335,800 B1 | * | 1/2002 | Balasubramanian | 358/1.9 |

FOREIGN PATENT DOCUMENTS

JP 58-16180 1/1983

OTHER PUBLICATIONS

Displaying Imaging, SCI, vol. 2, No. 1, 1993 (pp 17–25).*
"Display Imaging", SCI, vol. 2, No. 1, 1993 (pp. 17–25).

* cited by examiner

Primary Examiner—Edward Coles
Assistant Examiner—Tia Carter
(74) Attorney, Agent, or Firm—Fitzpatrick, Cella, Harper & Scinto

(57) ABSTRACT

Due to high resolution of color printers and the increased number of colors in image formation from four colors (Y, M, C and K) to six or seven colors including pale colors, the number of times of referring to LUT data and the number of times of calculation are increasing in interpolation operation for generating print data. In view of this, when inputted R, G and B data are converted to Y, M, C and K data by performing interpolation operation using a conversion table which expresses the input-output relations, if output values corresponding to eight vertices of a unit cube used for interpolation are the same value, the calculation is not performed but the value is outputted as the interpolation result.

10 Claims, 8 Drawing Sheets

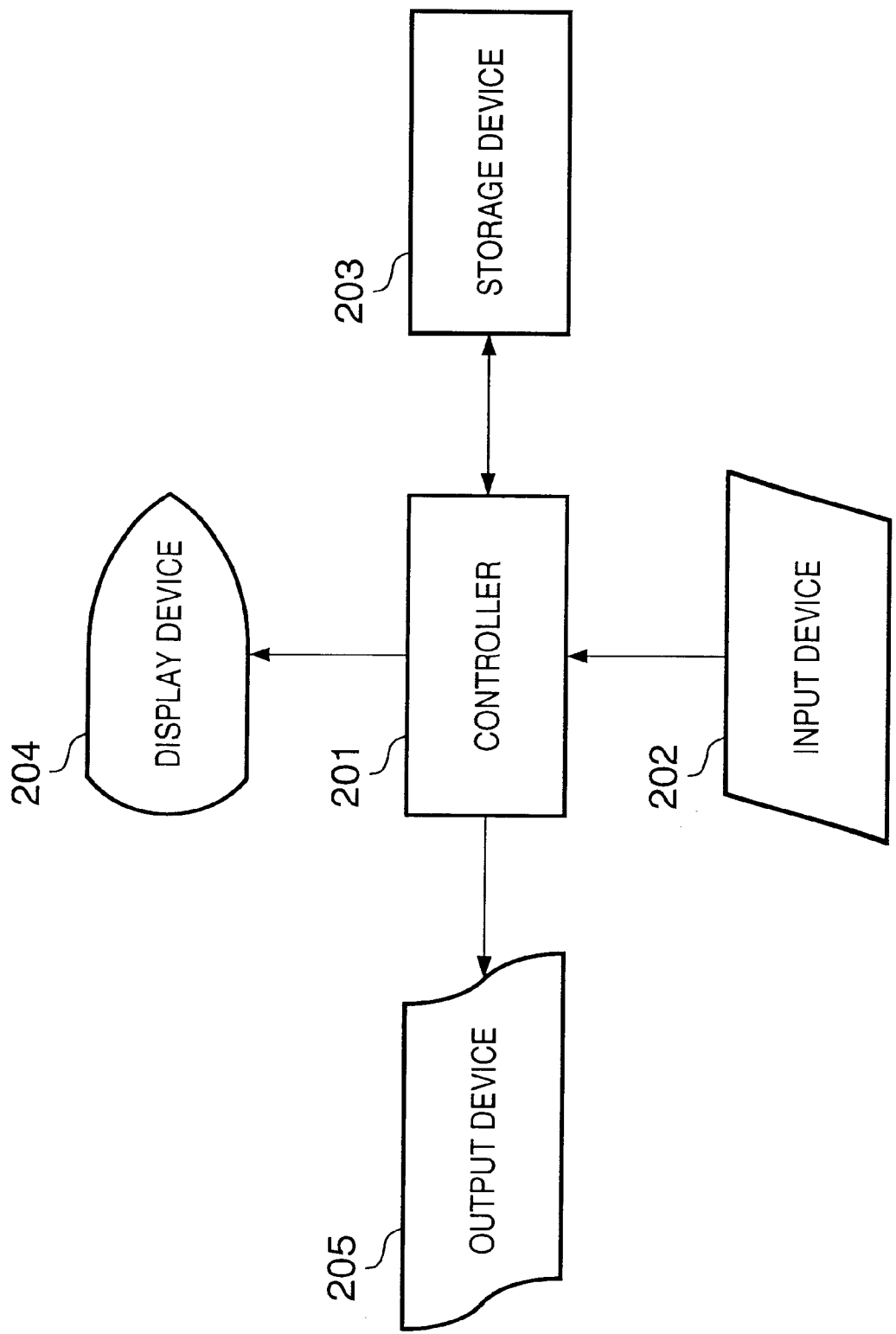

FIG. 3

| GRID | INPUT VALUE CORRESPONDING TO GRID | | | OUTPUT VALUE CORRESPONDING TO GRID | | | |
|---|---|---|---|---|---|---|---|
| | R | G | B | C | M | Y | K |
| (0,0,0) | 0 | 0 | 0 | 0 | 0 | 0 | 255 |
| (0,0,1) | 0 | 0 | 32 | 32 | 32 | 0 | 223 |
| (0,0,2) | 0 | 0 | 64 | 64 | 64 | 0 | 191 |
| . | . | . | . | . | . | . | . |
| . | . | . | . | . | . | . | . |
| . | . | . | . | . | . | . | . |
| . | . | . | . | . | . | . | . |
| (7,7,6) | 255 | 255 | 223 | 32 | 32 | 0 | 0 |
| (7,7,7) | 255 | 255 | 255 | 0 | 0 | 0 | 0 |

FIG. 7

| GRID | INPUT VALUE CORRESPONDING TO GRID | | | OUTPUT VALUE CORRESPONDING TO GRID | | | | | | |
|---|---|---|---|---|---|---|---|---|---|---|
| | R | G | B | C | M | Y | K | c | m | y |
| (0,0,0) | 0 | 0 | 0 | 0 | 0 | 0 | 255 | 0 | 0 | 0 |
| (0,0,1) | 32 | 0 | 0 | 0 | 0 | 0 | 223 | 64 | 64 | 0 |
| (0,0,2) | 64 | 0 | 0 | 0 | 64 | 64 | 191 | 0 | 0 | 0 |
| . | . | . | . | . | . | . | . | . | . | . |
| . | . | . | . | . | . | . | . | . | . | . |
| . | . | . | . | . | . | . | . | . | . | . |
| . | . | . | . | . | . | . | . | . | . | . |
| (7,7,6) | 255 | 255 | 223 | 0 | 0 | 0 | 0 | 64 | 64 | 0 |
| (7,7,7) | 255 | 255 | 255 | 0 | 0 | 0 | 0 | 0 | 0 | 0 |

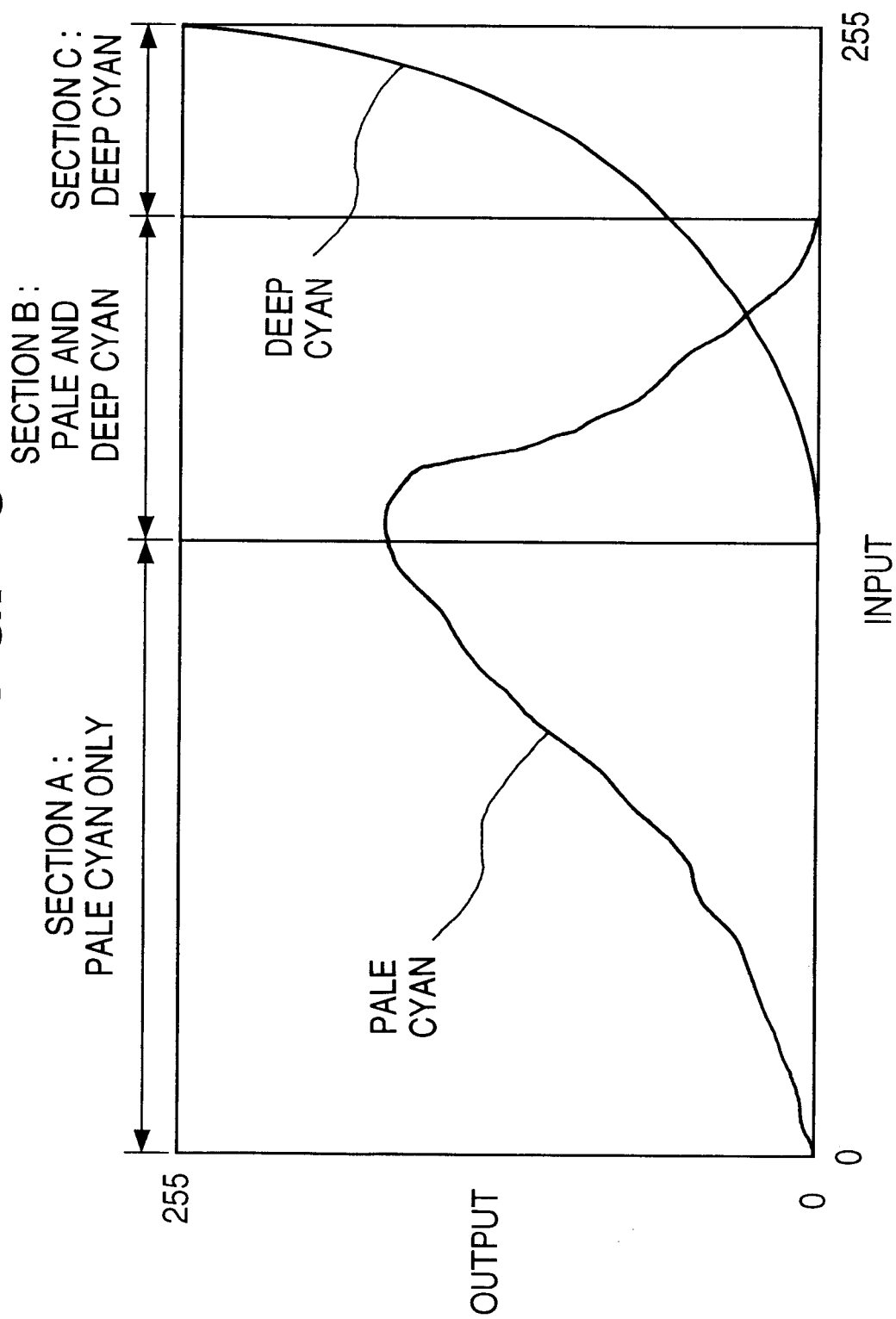

DATA CONVERTER AND METHOD

BACKGROUND OF THE INVENTION

The present invention relates to a data converter and method thereof, and more specifically, to a data converter and method thereof for performing data conversion processing by interpolation operation using a conversion table, and a recording medium in which data related to the conversion processing is recorded.

When an image synthesized by a personal computer is outputted to a printer, image color signals red (R), green (G), and blue (B) must be converted to color signals used by a printer, yellow (Y), magenta (M), cyan (C), and if necessary, black (K). The color space of the input signals and color space of the output signals in this conversion processing have a non-linear relation. When the input and output of the conversion processing have the non-linear relation, it is difficult to generate a model precisely expressing the conversion. Even if a conversion model is generated with a certain degree of precision, the calculation volume for conversion becomes excessively large. In order to solve the above problems in conversion processing, there is a method available for readily performing data conversion by generating a table where input data corresponds to output data.

However, even if a conversion method using a table is employed, each of the color components for R, G and B signals in the inputted color space has 256 levels. If a correspondence table of output color space for all 256 levels is to be generated, the volume of table data becomes excessively large. Thus, it is not a realistic method, considering the cost for a memory storing the table data.

In view of this problem, there is a method known for reducing the volume of table data by sampling the input color space at appropriate intervals and generating a table for the sampled points only. According to this method, an output corresponding to a position other than the sampled points in the inputted color space is obtained by linear interpolation operation using the sampled point data.

For instance, in three-dimensional conversion where the input-output relation is non-linear, such as the case where R, G and B signals are converted to Y, M, C and K signals, a three-dimensional lookup table (LUT) is used. In the three-dimensional lookup table, conversion data (also called grid data) for each grid point of the three-dimensional solid grid, corresponding to inputted R, G and B signals, is stored. Furthermore, to obtain output data (conversion data) for an input positioned other than the grid points, linear interpolation operation is performed by using a predetermined solid body having grid points as vertices and including the position of the inputted point.

Depending on the number of grid points used in the periphery of a position corresponding to the input data, there are various methods of three-dimensional data interpolation using linear interpolation. The methods include: cubic interpolation using eight grid points (*Display and Imaging*, SCI, Volume 2, Number 1, 1993, p17–25), prism interpolation using six grid points, tetrahedron interpolation using four grid points (Japanese Kokoku No. 58-16180) and so on.

Each time interpolation operation is performed, complicated calculation is performed regardless of grid data. Particularly in interpolation operation performed by software, the number of times of referring to grid data or the like and the number of times of addition, subtraction, multiplication, and division (four fundamental operation) are excessively large.

Furthermore, in addition to the increased resolution of print density in a color printer, the number of colors used in image formation is also increasing. Not only the four colors of Y, M, C and K, but also six colors inclusive of Y, M, C, K, pale magenta m and pale cyan c which are paler than M and C, or seven colors inclusive of pale yellow y, pale magenta m, and pale cyan c are available. Naturally, the print data amount increases, and the number of times of referring to grid data and the number of times of the four fundamental operation for interpolation also increase.

SUMMARY OF THE INVENTION

The present invention is made to solve the above problems, and has as its object to provide a data converter and method thereof for reducing the data processing volume related to interpolation operation.

To attain the above object, the present invention provides a data converter comprising: storing means for storing a conversion table which indicates relationship between an input and an output of the converter; and converting means for converting input data to output data by performing interpolation which uses the conversion table, wherein when data obtained from the conversion table and requested by the interpolation are the same, the converting means outputs one of the data as a result of interpolation.

Furthermore, the present invention provides a data conversion method for converting input data to output data by performing interpolation which uses a conversion table indicating relationship between an input and an output of conversion processing, the method comprising the step of outputting data having zero as a result of the interpolation when data obtained from the conversion table and requested by the interpolation are zeros.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a construction of an image processing system having a data converter according to a first embodiment of the present invention;

FIG. 3 is a table showing an example of grid data of grid points in the three-dimensional table shown in FIG. 2;

FIG. 7 is a table for converting R, G and B data to C, M, Y, K, c, m and y data; and FIG. 8 is a graph showing variation in data in a case of printing gradation.

DETAILED DESCRIPTION OF THE PREFERRED EMBODIMENTS

Figure 2A:
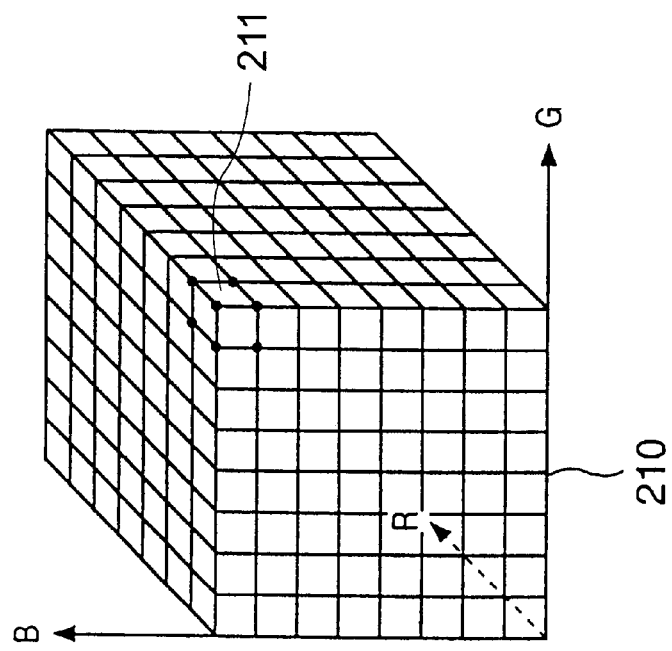
FIG. 2 is a conceptualized view of a three-dimensional table where each of R, G and B axes is divided into eight blocks.

Preferred embodiments of the present invention will be described in detail in accordance with the accompanying drawings.

First Embodiment

FIG. 1 is a block diagram showing a construction of an image processing system including a data converter according to a first embodiment of the present invention.

An output device 205 may be, for instance, a color printer which performs color printing on print paper with Y, M, C and K ink or toner. Note that image forming colors are not limited to the four colors (Y, M, C and K), but a color printer which forms an image with six or seven colors, including the aforementioned pale colors, may be used. However, in the following description, a case of using four colors is described.

Print data having Y, M, C and K density data for the output device 205 is obtained by image processing executed by a controller 201. The image processing includes color conversion processing which will be described below.

The controller 201 comprises a microprocessor (CPU) which executes color conversion and initializing therefor which will be described later, and data processing such as data conversion related to the data converter according to the present embodiment, and controls operation of mechanical components of each unit and so forth.

A storage device 203, comprising semiconductor memory such as ROM or RAM, and an external memory device such as hard disk, magneto-optical (MO) disk, floppy disk and the like, is provided for storing a lookup table (LUT) and calculation segments related to the data conversion processing according to the present embodiment.

A user of the image processing system shown in FIG. 1 is able to display an image, which has been inputted by an image input device such as an image scanner or digital still camera or the like and stored in the storage device 203, on a display device 204, e.g., a CRT or LCD by operating an input device 202 such as a keyboard or a mouse, or to perform desired image processing or modification on the image, or print the image by the output device 205. Images stored in the storage device 203 are generally multivalued image data having R, G and B luminance data. In order to generate print data for the output device 205, color conversion processing is necessary. The color conversion processing is to convert e.g., R, G and B image signals each having 8 bits to Y, M, C and K image signals each having 8 bits, by using a LUT and interpolation operation.

Note that the data conversion processing of the present embodiment is not limited to the image processing system shown in FIG. 1, but is applicable to an arbitrary apparatus or system performing data conversion processing by using a LUT and interpolation operation. For instance, it is well known that an apparatus such as a color copy machine performs color conversion. It is apparent that the data conversion processing according to the present embodiment is applicable to such apparatus or system.

<Interpolation Operation>

Hereinafter, as an interpolation method, an example of a cubic interpolation using eight grid data in the neighborhood of inputted data is described.

Figure 2B:
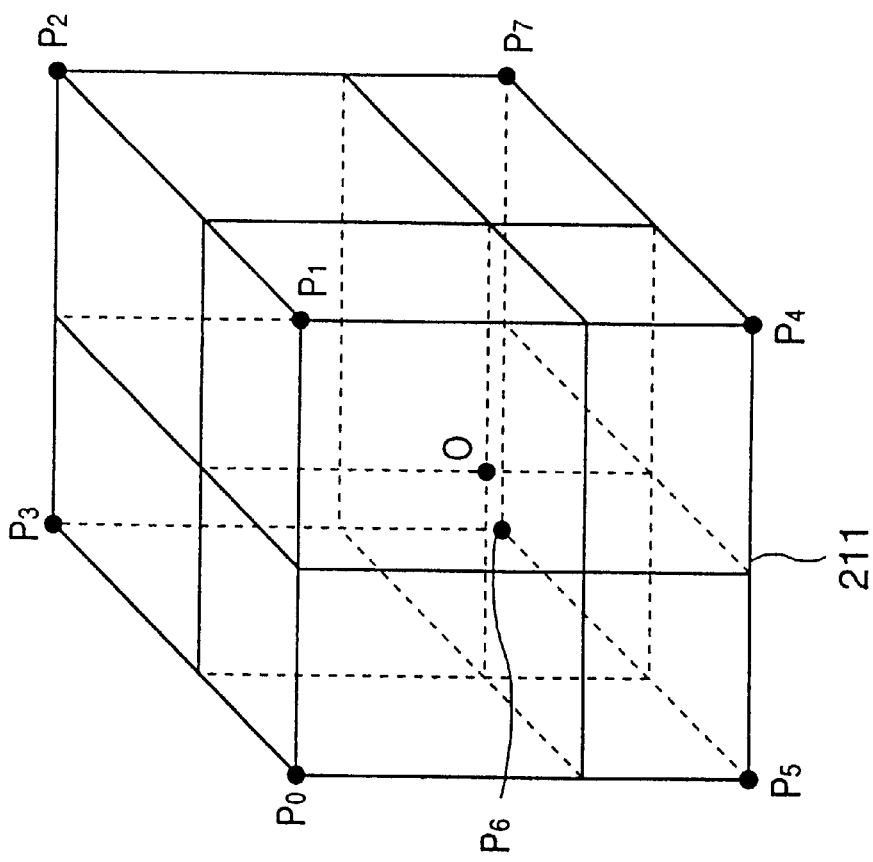

FIG. 2 is a conceptualized view of a three-dimensional table 210 used for the cubic interpolation where the space is divided into eight blocks in R, G and B axes. In each grid points of the three-dimensional table 210, output values (grid data) shown in FIG. 3 are set. Thus, $9^3=729$ grid points exist in the three-dimensional table 210, and 729×3 (for R, G and B)×4 (for Y, M, C and K)=8748 data are stored in the LUT.

Assume that R, G and B color signals positioned at point O of a three-dimensional coordinate system (three-dimensional table 210) are inputted. In this case, there is a unit cube 211 including the point O and having the grid points P0 to P7 as vertices. Furthermore, if the unit cube 211 is divided by planes, which orthogonally intersect with each of the R, G and B axes and pass the point O, eight rectangular parallelepipeds are generated. Assuming that the volume of the rectangular parallelepiped is Vi to correspond with the vertex point Pi, output values Oout (Oout$_C$, Oout$_M$, Oout$_Y$, Oout$_K$), indicative of the interpolation result corresponding to the position of point O, are obtained by the interpolation operation shown in equation (1).

$$Oout_C = \sum_{i=0}^{7}(Pi_C \times V_{7-i}) \Big/ \sum_{i=0}^{7} Vi$$

$$Oout_M = \sum_{i=0}^{7}(Pi_M \times V_{7-i}) \Big/ \sum_{i=0}^{7} Vi$$

$$Oout_Y = \sum_{i=0}^{7}(Pi_Y \times V_{7-i}) \Big/ \sum_{i=0}^{7} Vi$$

$$Oout_K = \sum_{i=0}^{7}(Pi_K \times V_{7-i}) \Big/ \sum_{i=0}^{7} Vi$$

(1)

where Pi=(Pi$_C$, Pi$_M$, Pi$_Y$, Pi$_K$), Pi$_C$ being a cyan value, Pi$_M$ being a magenta value, Pi$_Y$ being a yellow value, and Pi$_K$ being a black value.

Figure 5:
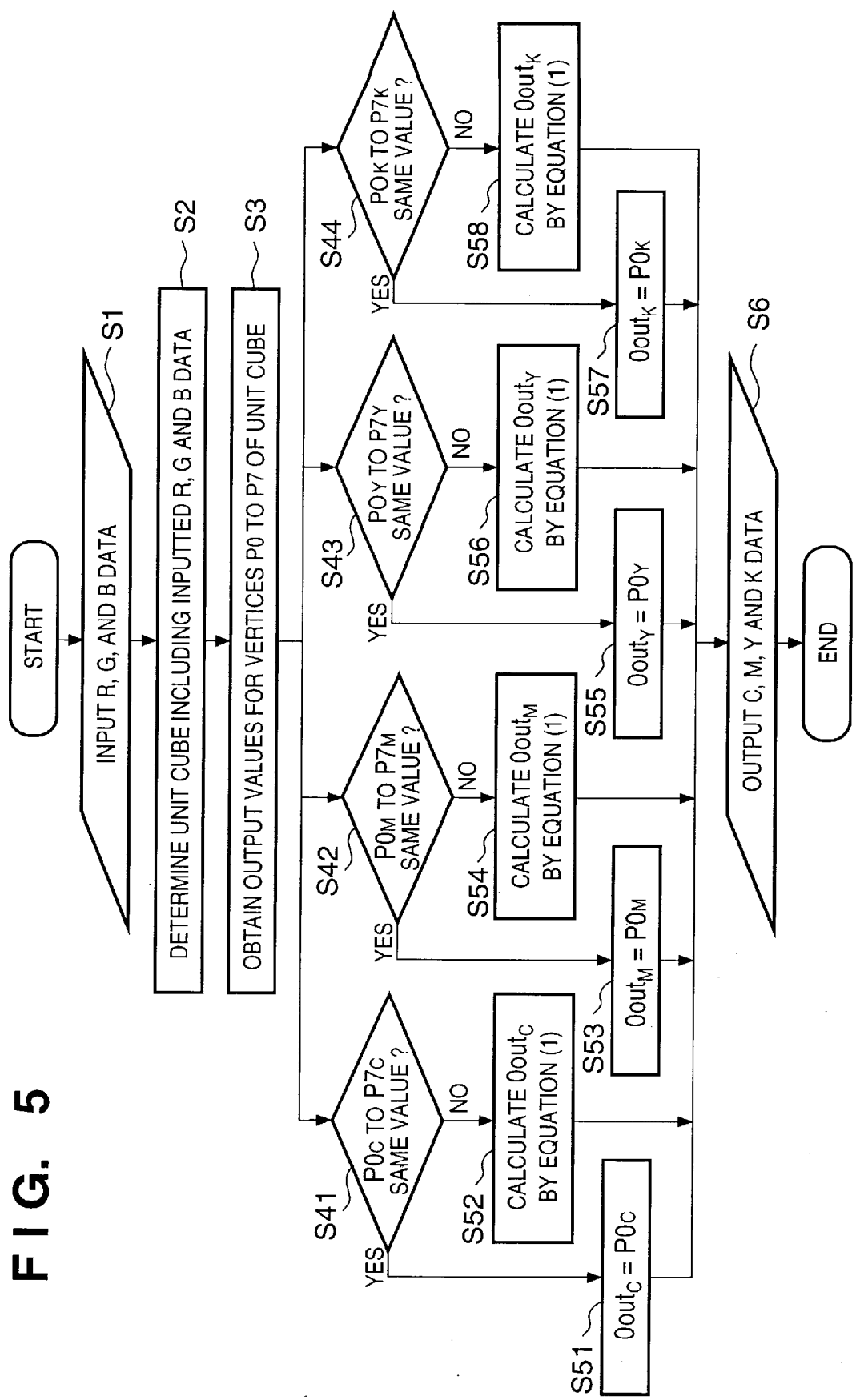
FIG. 5 is a flowchart showing interpolation operation according to the first embodiment.

FIG. 5 is a flowchart showing the process realizing interpolation operation, which is executed by the CPU in the controller 201.

In step S1, R, G and B data each color having 8 bits are inputted, and a unit cube of the three-dimensional table, to which the inputted R, G and B data belong, is determined in step S2. In step S3, output values for the eight grid points P0 to P7 (vertices) of the unit cube to which the inputted R, G and B data belong are obtained from a LUT. In step S41, it is determined whether or not the cyan components P0$_C$ to P7$_C$ of the obtained output values are all of the same value. If all have the same value, Oout$_C$=P0$_C$ is set in step S51. If a different value is found in the cyan components P0$_C$ to P7$_C$, interpolation operation is performed in accordance with equation (1) in step S52 to obtain Oout$_C$. Similarly, Oout$_M$, Oout$_Y$ and Oout$_K$ are obtained in steps S42 to S44 and S53 to S58. In step S6, output values Oout (Oout$_C$, Oout$_M$, Oout$_Y$, Oout$_K$) are outputted as the C, M, Y and K data each color having 8 bits. Note that the steps S1 to S6 are repeated pixel by pixel until all pixels of the inputted image data are processed.

For instance, if P0$_M$ to P7$_M$ have the same value, P0$_Y$ to P7$_Y$ have the same value, and P0$_K$ to P7$_K$ have the same value, interpolation operation is not necessary with respect to M, Y and K. Since Oout$_M$=P0$_M$, Oout$_Y$=P0$_Y$, and Oout$_K$=P0$_K$ stand, only Oout$_C$ needs to be calculated by equation (1). Therefore, in a case where color components of eight grid points P0 to P7 to be referred to have the same value, the number of times referring to the LUT and the number of times of the addition, multiplication and division included in equation (1) can be largely reduced.

As has been described above, according to the present embodiment, since interpolation operation can be skipped depending on the output values for the grid points in the interpolation operation using a LUT, the number of times of referring to the LUT and the number of times of calculation are reduced. Thus, the data conversion processing including interpolation operation can be executed at high speed.

Accordingly, even though the time saved for interpolation operation with respect to one input data is trivial, when interpolation operation is performed on a large number of pixels for processing a high resolution image, a great amount of time can be saved in the entire interpolation operation.

Second Embodiment

Hereinafter, a data converter according to the second embodiment is described. Note that in the second embodiment, those components having substantially the same configuration as those of the first embodiment have the same reference numerals, and detailed description thereof will be omitted.

In the second embodiment, interpolation operation is performed by using, for instance, tetrahedron interpolation which is disclosed in Japanese Kokoku No. 58-16180.

Figure 4:
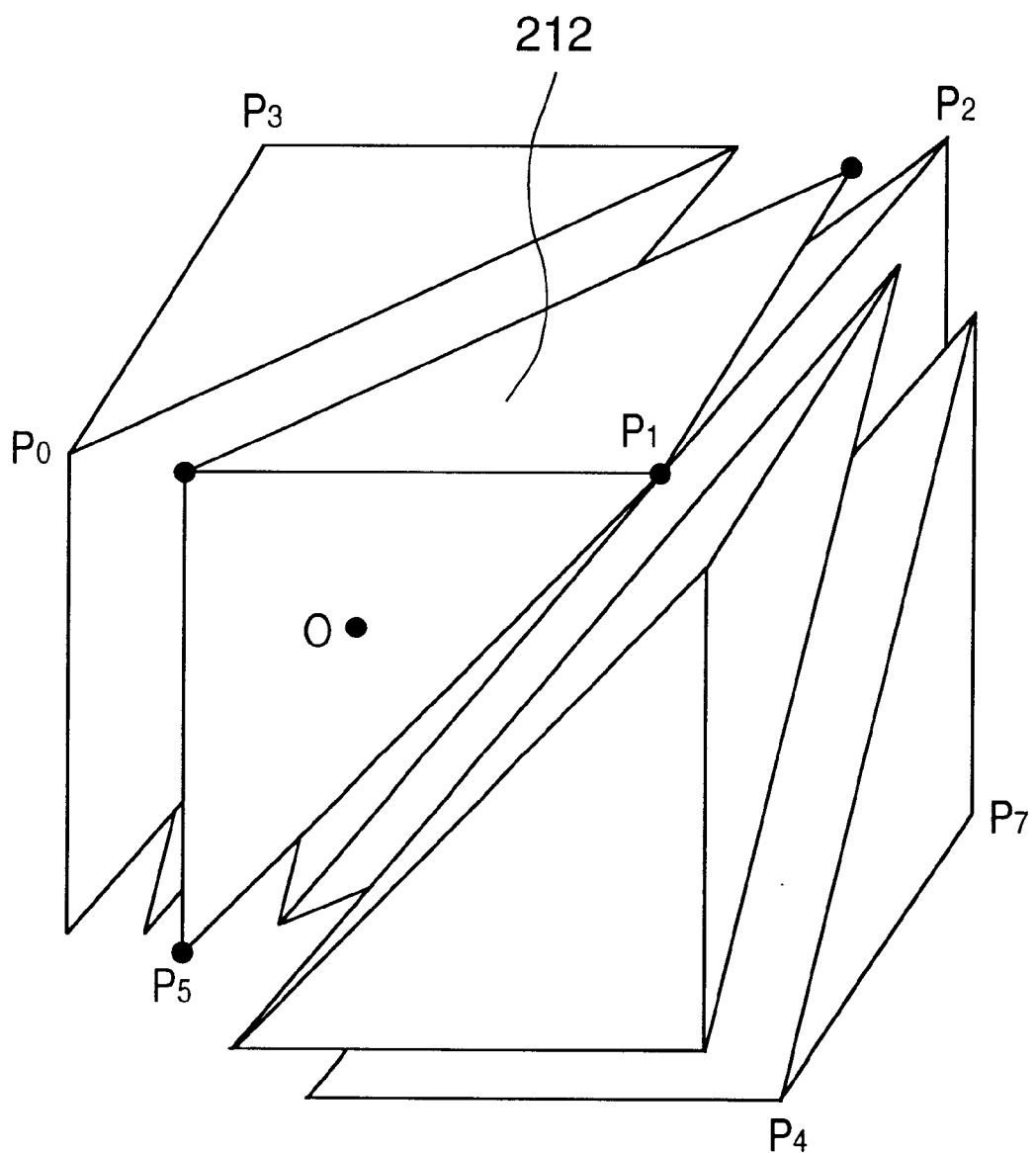
FIG. 4 is an explanatory view of unit tetrahedrons used for interpolation operation in a second embodiment.

Assume that R, G and B color signals positioned at point O of a three-dimensional coordinate system (three-dimensional table 210) are inputted. In this case, there is a unit cube 211 including the point O and having the grid points P0 to P7 as vertices. FIG. 4 shows that the unit cube 211 is divided into six tetrahedrons. In the second embodiment, determination is made as to which of the six tetrahedrons the point O belongs, then interpolation operation is performed based on output values corresponding to the four vertices (grid points) of the tetrahedron, and an output value Oout (Oout$_C$, Oout$_M$, Oout$_Y$, Oout$_K$) representing the interpolation result corresponding to the position of point O is obtained.

Hereinafter, description is provided on a case where the point O belongs to the unit tetrahedron 212, having P0, P1, P2 and P5 as vertices as shown in FIG. 4. The interpolation operation is executed by equation (2).

$$\begin{aligned}
Oout_C &= P5_C + b \times (P0_C - P5_C) + g \times (P1_C - P0_C) + r \times (P2_C - P1_C) \\
Oout_M &= P5_M + b \times (P0_M - P5_M) + g \times (P1_M - P0_M) + r \times (P2_M - P1_M) \\
Oout_Y &= P5_Y + b \times (P0_Y - P5_Y) + g \times (P1_Y - P0_Y) + r \times (P2_Y - P1_Y) \\
Oout_K &= P5_K + b \times (P0_K - P5_K) + g \times (P1_K - P0_K) + r \times (P2_K - P1_K)
\end{aligned} \quad (2)$$

where r, g and b respectively denote a distance for each axis, determined by position of point O in the unit cube.

Figure 6:
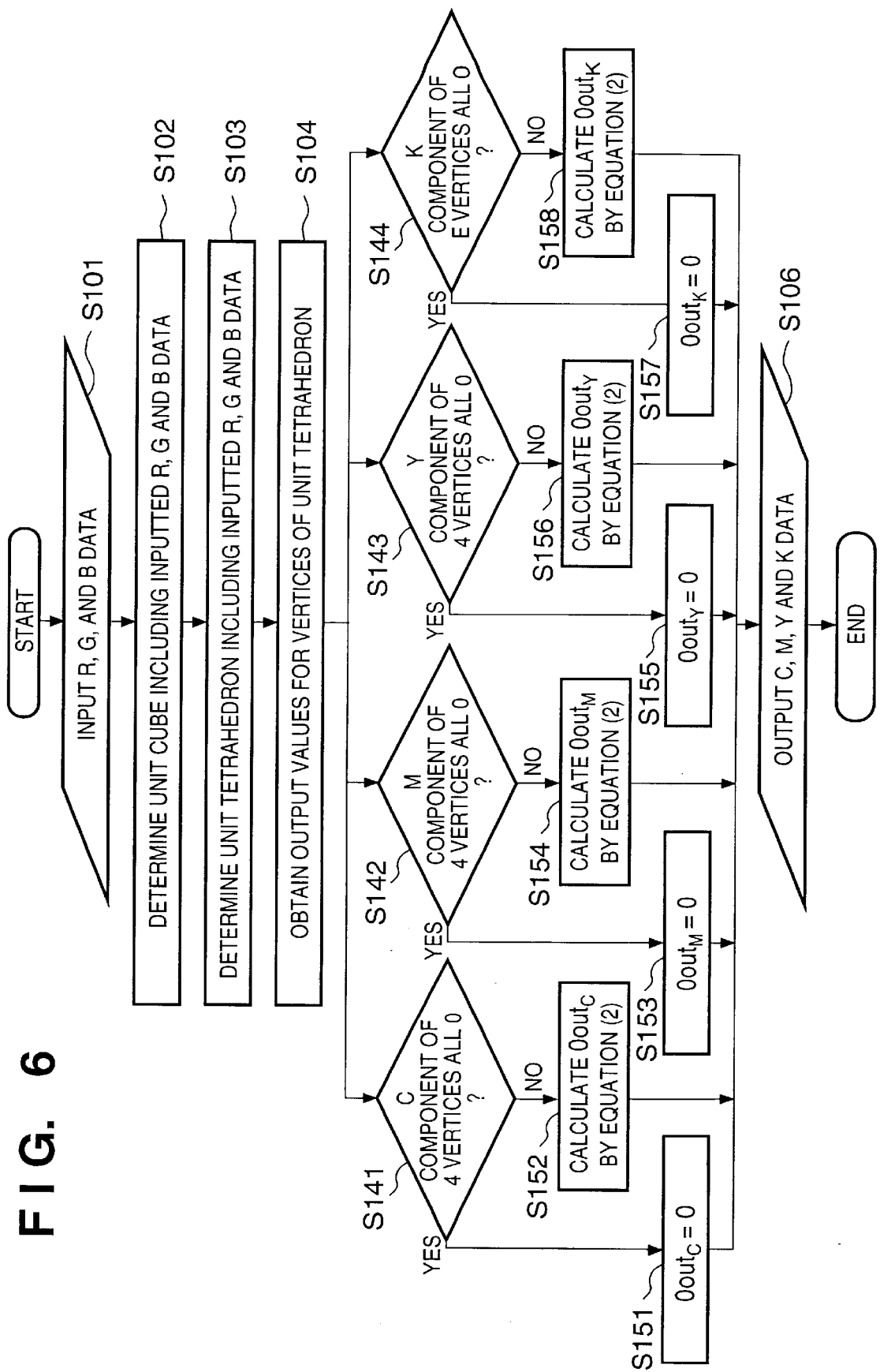
FIG. 6 is a flowchart showing interpolation operation according to the second embodiment.

FIG. 6 is a flowchart showing a process realizing interpolation operation, which is executed by the CPU in the controller 201.

In step S101, R, G and B data each color having 8 bits are inputted, and a unit cube of the three-dimensional table, to which the inputted R, G and B data belongs, is determined in step S102. In step S103, a unit tetrahedron, to which the inputted R, G and B data belongs, is determined. In step S104, output values for four gird points P0, P1, P2 and P5 (vertices) of the unit tetrahedron to which the inputted R, G and B data belong are obtained from a LUT. (In step S141, it is determined whether or not the cyan components P0$_C$, P1$_C$, P2$_C$ and P5$_C$ of the obtained output values are zeros.) If all values are zeros, Oout$_C$=0 is set in step S151. If a value other than zero is found, interpolation operation is performed in accordance with equation (2) in step S152 to obtain Oout$_C$. Similarly, Oout$_M$, Oout$_Y$ and Oout$_K$ are obtained in steps S142 to S144 and S153 to S158. In step S106, output values Oout (Oout$_C$, Oout$_M$, Oout$_Y$, Oout$_K$) are outputted as the C, M, Y and K data each color having 8 bits. Note that the steps S101 to S106 are repeated pixel by pixel until all pixels of the inputted image data are processed.

Accordingly, as similar to the first embodiment, in a case where the color components of four grid points to be referred to are all 0, the number of times of referring to the LUT and the number of times of addition, subtraction, and multiplication included in equation (2) can be largely reduced.

According to the second embodiment set forth above, similar to the first embodiment, since interpolation operation can be skipped depending on the output values for the grid points in the interpolation operation using a LUT, the number of times of referring to the LUT and the number of times of calculation are reduced. Thus, the data conversion processing including interpolation operation can be executed at high speed. Accordingly, even though the time saved for interpolation operation with respect to one input data is trivial, when interpolation operation is performed on a large number of pixels for processing a high resolution image, a great amount of time can be saved in the entire interpolation operation.

Third Embodiment

The third embodiment describes conversion processing using a lookup table shown in FIG. 7. In the lookup table for converting R, G and B data to C, M, Y, K, c, m, and y data shown in FIG. 7, there are more chances of having a value zero for the output data (grid data), compared to a case of using a lookup table using four colors (C, M, Y and K). For instance, assuming a case of printing cyan gradation, print data in the section A in FIG. 8 includes only a pale cyan component c; thus, other six color components besides pale cyan component c are all zeros. Therefore, the processing speed of a seven-color printer employing the present invention does not simply become 7/4 times the processing speed of a four-color printer, but efficient printing processing is possible. With regard to the section C in FIG. 8, since print data includes only a deep cyan component C, the same explanation applies for the processing speed. However, with regard to the section B in FIG. 8, the processing speed declines since data processing must be performed for two colors (c and C). However, in a case of printing cyan gradation, since most of the print data falls within the sections A and C, efficient processing is possible as a whole. The above description applies to other color components.

It is empirically known that, in most cases, at least some of the seven color components of a grid point are zero. Only in the section B in FIG. 8, values other than zero appear for both pale-color ink and deep-color ink. In other words, only in the section B which is a small part of the entire tone area, values other than zero appear for all seven colors. Thus, according to the seven-color printer employing the present invention, calculation or operation of referring to the LUT for meaningless data (data having value zero) are not performed. Therefore, interpolation operation and data conversion can be executed at high speed.

Note that although examples of using cubic interpolation or tetrahedron interpolation have been provided in the above-described embodiments, other interpolation solids may be used to achieve the similar effects to that of the foregoing embodiments, as long as the calculation segment corresponding to the interpolation solid is used.

Furthermore, although color conversion from R, G and B data to C, M, Y and K data is described in the above-described embodiments, the above-described data conversion processing can also be applied to, for instance, color correction processing from RGB color space of an image input device to RGB color space of a monitor, color space conversion processing from RGB color space to a uniform color space such as CIE Lab, CIE Luv, CIE XYZ and so on, or processing such as color space compression or color space decompression or the like.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. A data converter comprising:
a memory, arranged to store a conversion table which indicates relationship between an input and an output of said converter; and
a converting section, arranged to convert input data to output data by performing interpolation, which uses the conversion table, in each of a plurality of color components included in the output data,
wherein when data obtained from the conversion table and requested by the interpolation in one of the color components are the same, said converting section outputs one of the data as a result of interpolation in the one of the color components.

2. The converter according to claim 1, wherein said converting section converts a color space of input image data to a color space of output image data.

3. A data converter comprising:
a memory, arranged to store a conversion table which indicates relationship between an input and an output of said converter; and
a converting section, arranged to convert input data to output data by performing interpolation, which uses the conversion table, in each of a plurality of color components included in the output data,
wherein when data obtained from the conversion table and requested by the interpolation in one of the color components are zeros, said converting section outputs data having zero as a result of the interpolation in the one of the color components.

4. The converter according to claim 3, wherein said converting section converts a color space of input image data to a color space of output image data.

5. A data conversion method for converting input data to output data by performing interpolation, which uses a conversion table indicating relationship between an input and an output of conversion processing, in each of a plurality of color components included in the output data, said method comprising the step of outputting one of data as a result of the interpolation in one of the color components when the data obtained from the conversion table and requested by the interpolation in the one of the color components are the same.

6. The method according to claim 5, wherein the conversion processing converts a color space of input image data to a color space of output image data.

7. A data conversion method for converting input data to output data by performing interpolation, which uses a conversion table indicating relationship between an input and an output of conversion processing, in each of a plurality of color components included in the output data, said method comprising the step of outputting data having zero as a result of the interpolation in one of the color components when data obtained from the conversion table and requested by the interpolation in the one of the color components are zeros.

8. The method according to claim 7, wherein the conversion processing converts a color space of input image data to a color space of output image data.

9. A computer program product comprising a computer readable medium having computer program code, for converting input data to output data by performing interpolation, which uses a conversion table indicating relationship between an input and an output of conversion processing, in each of a plurality of color components included in the output data, said product comprising conversion procedure code for outputting one of data as a result of the interpolation in one of the color components when the data obtained from the conversion table and requested by the interpolation in the one of the color components are the same.

10. A computer program product comprising a computer readable medium having computer program code, for converting input data to output data by performing interpolation, which uses a conversion table indicating relationship between an input and an output of conversion processing, in each of a plurality of color components included in the output data, said product comprising conversion procedure code for outputting data having zero as a result of the interpolation in one of the color components when data obtained from the conversion table and requested by the interpolation in the one of the color components are zeros.

* * * * *

UNITED STATES PATENT AND TRADEMARK OFFICE
CERTIFICATE OF CORRECTION

PATENT NO. : 6,556,312 B1
DATED : April 29, 2003
INVENTOR(S) : Nagatani

It is certified that error appears in the above-identified patent and that said Letters Patent is hereby corrected as shown below:

<u>Column 5,</u>
Line 54, "(In" should read -- In --; and
Line 56, "zeros.)" should read -- zeros. --.

Signed and Sealed this

Twentieth Day of January, 2004

JON W. DUDAS
*Acting Director of the United States Patent and Trademark Office*